Aug. 17, 1954

A. C. GUY ET AL 2,686,828

CABLE CLAMP AND SEAL

Filed Aug. 31, 1950

INVENTORS
Albert C. Guy &
Robert E. Ulrich
BY
Morrish Rabkin
ATTORNEY

Patented Aug. 17, 1954

2,686,828

UNITED STATES PATENT OFFICE 2,686,828
CABLE CLAMP AND SEAL

Albert C. Guy, Hartford, and Robert E. Ulrich, Riverton, N. J., assignors to Radio Corporation of America, a corporation of Delaware Application August 31, 1950, Serial No. 182,478

The terminal 15 years of the term of the patent to be granted has been disclaimed 9 Claims. (Cl. 174—65)

This invention relates to a combination clamp and fluid-tight seal for cables or electrical conductors extending through an opening in a walled enclosure.

In some applications, it is found desirable to provide a fluid-tight seal between the cable and the casing into which it extends. For such purposes, it has been found advantageous to provide the casing or housing with a gland. A suitable ring of pliable or elastic material is inserted in the gland which is compressed tightly about the cable after the latter is inserted through the opening so that the pliable material forms a seal between the cable and the casing wall. Although glands of this type are satisfactory for some purposes, they possess the disadvantage that they do not provide a positive means for preventing movement of the cable with respect to the casing, nor are they effective in preventing rotation of the cable within the gland member.

A primary object of the present invention is to provide an improved clamp and fluid-tight seal for cables extending through an opening in a walled enclosure.

It is also an object of the present invention to provide a clamp for an electrical conductor passing through a walled enclosure and attached to electrical components disposed therewithin which will resist torsional or pulling strain applied to the cable externally of the enclosure.

Another object of the present invention is to provide a cable clamp and seal for a cable extending through a walled enclosure which can be easily removed without destruction of the seal itself.

It is a further object of the present invention to provide a combination clamp and fluid-tight seal for an electrical conductor extending through the wall of an enclosure which is simple in construction, highly efficient and which will accommodate a wide range of cable diameters.

The present invention comprises an improved clamping device and fluid-tight seal for a cable which extends through an opening in the wall of an enclosure. The clamping device includes means for preventing rotational and axial movement of the cable. The invention also includes sealing means for the cable opening. The clamping means and sealing means cooperate in that the same pressure applied to effect clamping of the cable is used to effect a fluid-tight seal.

Figure 1:
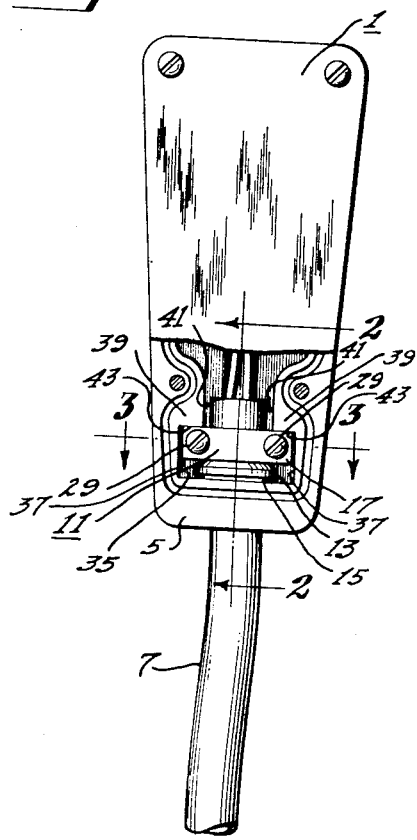
Figure 2:
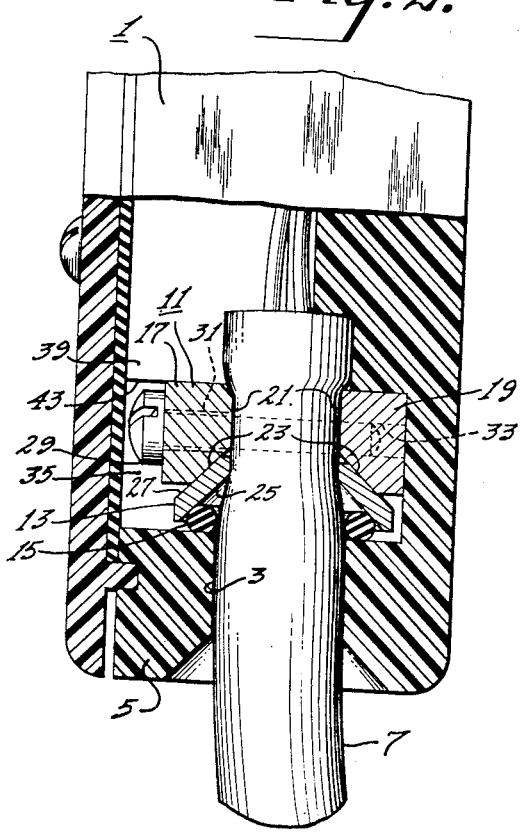
Figure 3:
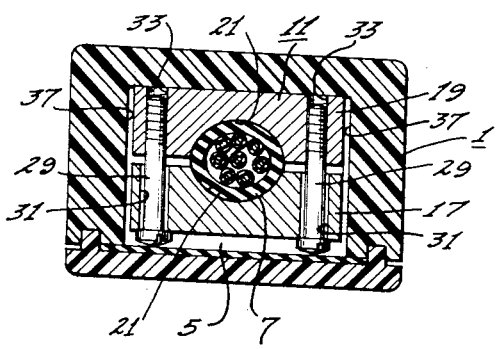

The novel features characteristic of the present invention, as well as additional objects and advantages thereof, will be better understood from the following detailed description when read in connection with the accompanying drawing, in which Figure 1 is a plan view of a preferred embodiment of the present invention illustrating its application to a cable extending through an opening in an enclosure the top of which is partly broken away, Figure 2 is an enlarged, sectional view, taken along the line 2—2 of Figure 1, and Figure 3 is an enlarged, sectional view, taken along the line 3—3 of Figure 1.

Referring more particularly to the drawing, wherein similar reference characters designate corresponding parts throughout, the present invention is shown applied to a walled enclosure 1, which may comprise any suitable type of casing or housing within which electrical or other components (not shown) are disposed for protection. An aperture 3 is provided in a wall 5 of the housing 1, through which an electrical conductor or cable 7 is extended for connection with the components within the casing 1.

In order to protect the wires from being severed from their connection with components within the housing, as by pulling or twisting the cable 7, as well as to provide a fluid-tight seal between the cable 7 and the housing wall 5, a combination clamp and seal is provided. The combination clamp and seal comprises a clamp 11, a hollow gland member 13, and a compressible ring 15.

The clamp 11 comprises a pair of jaws or block members 17, 19 disposed in spaced apart relation on opposite sides of the cable 7. The adjacent faces or sides of the block members 17, 19 are cut away to provide cable engaging surfaces 21 and gland engaging surfaces 23. The cable engaging surfaces 21 are concave and provide a seat for the cable 7. The block members 17, 19 and the cable engaging portion are so arranged that in a clamped position, as shown particularly in Figure 3 of the drawing, the cable 7 is compressed to an oval shape. The compression of the cable 7 into an oval shape helps to prevent rotation of the cable with respect to the block members 17, 19.

The gland engaging surfaces 23 are also concave and taper outwardly from the cable engaging surfaces 21 to provide conical surfaces against which the gland member 13 seats. The gland member 13 is a hollow, frusto-conical member, the interior surface 25 of which is tapered to form a trumpet-mouthed gland of a diameter to receive the compressible ring 15 and the exterior surface 27 of which is complementary to the gland engaging surface 23.

The compressible ring 15 comprises an annular member constituted of an elastic or resilient material, such as rubber, or the like, the internal diameter of which is sufficiently large to receive the cable 7. The ring 15 is of a size to seat within the gland member 13 adjacent the base periphery 28 thereof.

For the purpose of forcing or clamping the block members 17, 19 tightly around the cable 7, bolts or screws 29, or other suitable means for applying clamping pressure, are provided. The bolts 29 are disposed adjacent opposite ends of the block members on opposite sides of the cable 7. The bolts 29 extend through openings 31 in the one block member 17 and engage threaded apertures 33 in the other block member 19.

The clamp and seal members are disposed in a compartment 35 within the casing 1 and defined by the apertured wall 5, side walls 37 and shoulders 39 extending from the side walls. The shoulders 39 are spaced apart an amount sufficient to provide a space 41 through which the cable 7 extends. The walls 43 of the shoulders 31 facing the apertured wall 5 are arranged so that when end portions of the block members 17, 19 abut them the block members will be disposed substantially parallel with respect to the wall 5.

In assembling the parts prior to inserting the cable 7 into the casing 1, the clamp and seal components are aligned within the casing compartment 35 with the compressible ring 15 disposed next to the casing wall 5 and surrounding the aperture 3. Successively thereafter the gland member 13 and the block members 17, 19 are disposed in alignment preparatory to receiving the cable 7 for extension therethrough.

The cable 7 is extended respectively through the casing wall aperture 3, the compressible ring 15, the gland member 13 and between the block members 17, 19 an amount sufficient to attach it to components within the housing 1. The bolts 29 are tightened to force the blocks 17, 19 into engagement with the cable 7. Simultaneously with the clamping force transmitted through the block members on the cable, pressure is exerted on the frusto-conical gland member 13 to force it outwardly from its seat within the recess provided by the gland engaging surfaces 23. Since the block members 17, 19 are prevented from moving longitudinally of the cable in a direction away from the casing wall opening 3 by the shoulders 39, the gland member 13 will be urged in the direction of the casing wall opening 3. Movement of the gland member 13 in this direction will force the compressible ring 15 into fluid-tight relation between the cable 7, the interior surface 25 of the gland member, and the portion of the wall 5 surrounding the opening 3.

From the foregoing, it will be obvious that the present invention provides a combination clamp and fluid-tight seal for a cable extending through an opening in a walled enclosure. The cable is not only secured against movement in either direction longitudinally thereof, but also against rotative movement. In addition, the arrangement of parts is such, that, cables can be quickly and easily replaced without destruction of the seal ring.

Although only a single preferred embodiment of the present invention is illustrated and described herein, it should be obvious to those persons skilled in the art that various changes and modifications thereof are possible within the spirit of the invention. For example, different means may be provided for applying clamping pressure, or more than two block members may be employed. Therefore, it is desired that the particular form of the present invention described herein shall be considered as illustrative and not as limiting.

What is claimed is:

1. A cable clamp and seal for a cable adapted to pass through an opening in a wall of a casing, said clamp and seal comprising in combination a plurality of spaced apart members adapted to engage the outer surface of said cable, sealing means comprising a gland member and a compressible ring disposed between said spaced apart members and said casing for effecting a fluid tight seal between said cable and said casing wall, adjustable means urging said spaced apart members towards each other to exert pressure through said spaced apart members on said cable, and means including said spaced apart members for urging said gland member away from said spaced apart members and toward said casing wall upon movement of said spaced apart members towards each other, thereby to press said compressible ring against said casing wall.

2. A cable clamp and seal for a cable adapted to pass through an opening in a wall of a casing, said clamp and seal comprising in combination a plurality of spaced apart members having means for frictionally holding said cable against movement, a gland member having an aperture through which said cable is adapted to extend, said gland member being disposed in contact with said spaced apart members, a compressible seal ring adapted to closely fit around said cable and disposed between said gland member and said casing wall, means compressing said spaced apart members toward each other to exert pressure through said spaced apart members on said cable, and means including said spaced apart members for urging said gland member away from said spaced apart members and toward said casing wall upon movement of said spaced apart members toward each other, thereby to press said seal ring against said casing wall.

3. The invention as defined in claim 2 and wherein said gland member and said spaced apart members are provided with complementary tapered surfaces disposed in contact, said surfaces being tapered outwardly with respect to said cable in the direction of said seal ring.

4. The invention as defined in claim 2 and wherein said gland member comprises a frusto-conical member, and wherein said spaced apart members are provided with tapered surfaces, said tapered surfaces and the exterior surface of said frusto-conical member being complementary and disposed in contact with each other.

5. The invention as defined in claim 4 and wherein said seal ring is dimensioned to seat within said gland member adjacent the base periphery thereof.

6. The combination with a walled enclosure having an aperture in a wall thereof through which a cable is adapted to extend, of a cable clamp and fluid-tight seal comprising a gland member having an aperture through which said cable is adapted to extend, said gland member being disposed within said enclosure and movable along said cable, clamping means within said enclosure engageable with the exterior surface of said cable, said clamping means including means movable laterally of the cable for engaging one end of said gland member thereby to bias said gland member toward said enclosure aperture, and compressible means in contact with the opposite end of said gland member for effecting a fluid-tight seal between said casing and said cable.

7. The invention defined in claim 6 wherein said clamping means comprises a plurality of block members, and wherein the surface of said block members contacting said cable is of such configuration as to deform said cable upon clamping pressure being applied thereto through said block members.

8. The invention defined in claim 6 wherein said clamping means comprises a plurality of block members each having an exterior surface arranged to contact interior surfaces of said walled enclosure to prevent rotation thereof.

9. The invention defined in claim 6 wherein said enclosure is provided with an interior wall in spaced apart relation to said first mentioned wall, said interior wall being provided with an aperture through which said cable is adapted to extend, and wherein the side of said clamping means opposite said gland member abuts said interior wall to prevent axial movement of said cable inwardly of said enclosure.

References Cited in the file of this patent

UNITED STATES PATENTS

| Number | Name | Date |
| --- | --- | --- |
| 416,144 | Wesslau | Nov. 26, 1889 |
| 1,041,300 | Kliegl | Oct. 15, 1912 |
| 1,604,298 | Neitzel | Oct. 26, 1926 |
| 1,762,510 | Edmonds | June 10, 1930 |
| 1,830,247 | Scott | Nov. 3, 1931 |
| 1,870,274 | Wulfert et al. | Aug. 9, 1932 |
| 2,030,370 | Hodtum | Feb. 11, 1936 |
| 2,311,427 | Winkelmeyer | Feb. 16, 1943 |
| 2,408,502 | Writzmann | Oct. 1, 1946 |
| 2,438,412 | Morris | Mar. 23, 1948 |